US006375525B1

(12) United States Patent
Kanno

(10) Patent No.: US 6,375,525 B1

(45) Date of Patent: Apr. 23, 2002

(54) IDLE SPEED CONTROL VALVE CONTROL SYSTEM

(75) Inventor: Isao Kanno, Iwata (JP)

(73) Assignee: Sanshin Kogyo Kabushiki Kaisha (JP)

(*) Notice: Subject to any disclaimer, the term of this patent is extended or adjusted under 35 U.S.C. 154(b) by 0 days.

(21) Appl. No.: 09/688,493

(22) Filed: Oct. 16, 2000

(30) Foreign Application Priority Data

Oct. 14, 1999 (JP) .......................................... 11-293053

(51) Int. Cl.[7] ................................................ B60K 41/00

(52) U.S. Cl. ...................... 440/87; 440/75; 123/339.19; 123/339.23

(58) Field of Search ................ 440/75, 87; 123/339.19, 123/339.23, 339.76

(56) References Cited

U.S. PATENT DOCUMENTS

| | | | |
|---|---|---|---|
| 5,261,368 A | 11/1993 | Umemoto | |
| 5,630,394 A | 5/1997 | Grizzle et al. | |
| 5,701,867 A | 12/1997 | Mizutani et al. | |
| 5,934,247 A | 8/1999 | Hashimoto et al. | |
| 6,119,653 A | 9/2000 | Morikami | |

*Primary Examiner*—Jesus D. Sotelo

(74) *Attorney, Agent, or Firm*—Knobbe, Martens, Olson & Bear, LLP

(57) ABSTRACT

An outboard motor comprises an engine mounted within an engine compartment. The engine comprises an induction system having an induction passage extending between an air intake box to a combustion chamber. A throttle valve is positioned along the passage. A bypass passage communicates with the passage at a location between the throttle valve and the combustion chamber. An adjustable valve controls flow through the bypass passage. The adjustable valve can be closed at a first rate if a transmission of the outboard motor is engaged and at a second rate if the transmission is disengaged.

20 Claims, 8 Drawing Sheets

IDLE SPEED CONTROL VALVE CONTROL SYSTEM

PRIORITY INFORMATION

This application is based on and claims priority to Japanese Patent Application No. 11-293053, filed Oct. 14, 1999, the entire contents of which is hereby expressly incorporated by reference.

BACKGROUND OF THE INVENTION

1. Field of the Invention

The present invention generally relates to idle speed controls for internal combustion engines used in marine applications. More specifically, the present invention relates to such systems in which throttle bypass levels are adjusted based on an operative position of an associated transmission as well as a throttle position.

2. Related Art

Outboard motors are powered by engines contained within an engine compartment of the outboard motor. The outboard motors are conventionally attached to watercraft to power the watercraft in a forward or reverse direction. As is known, the engine of the outboard motor is subject to increased loading when compared to that of an automobile, for instance. This increased loading generally results from the nature of the outboard motor and the environment of use of the outboard motor.

The engines that power the outboard motors may contain an intake system featuring a bypass passage. The bypass passage typically is linked to the intake system upstream and downstream of a throttle control valve. As is known, the throttle control valve controls the amount of air flowing through the induction system into the engine for combustion. When the throttle control valve is closed, the air flow rate is minimized and when the throttle control valve is opened, the flow rate through the induction system can be somewhat controlled. The use of a bypass passage allows air to bypass the throttle control valve for supply to the engine even when the throttle control valve is closed. In some instances, an ISC, or idle speed control valve, is positioned along the bypass passage. The ISC valve can be used to fine tune the idling engine speed when the throttle control valve is in a closed position.

Conventional ISC valves are designed to open when the throttle valve suddenly closes following a period of high speed operation. It is thought that by opening the ISC valves when the throttle valve closes, misfiring and stalling can be obviated or greatly reduced. Generally speaking, the ISC valves are closed when the throttle valve is opened and when the engine speed is low. The ISC valves are opened when the throttle valve is closed and when the engine speed is high. In some applications, the ISC valves can be suddenly opened during high speed operation of the engine and then gradually closed after the engine speed decreases below a preset level.

The positioning of the idle speed control valve often is controlled by inexpensive step motors. The inexpensive step motors typically have a slow response characteristic. In other words, the command to move is followed by a slight delay before the movement occurs. With reference now to FIG. 6, a conventional ISC valve control strategy implemented in such a system is illustrated in broken lines. As illustrated in this arrangement, the ISC valve remains closed while the throttle valve is opening. The ISC valve remains in the closed position until the throttle angle is rapidly decreased (i.e., the throttle valve closes under the biasing force of a spring, such as when the opening force provided by an operator controlled actuator is removed). Once the throttle angle is rapidly decreased, the ISC valve slowly opens under the control of the stepper motor. Because of the slow opening rate of the idle speed control valve, the air flow through the induction system does not properly match the desired change of the engine speed resulting from the rapid change in a throttle opening position. Accordingly, the engine can stall or misfire due to an inadequate supply of intake air. One way of correcting this is to provide an idle speed control valve in which the ISC valve opens more rapidly for each input signal to the stepper motor. A drawback from this approach is that a large ISC valve is required and the larger ISC valves increase cost and weight.

Another solution to the misfiring and stalling of the engine is to make the ISC valve more accurately follow the changes in a throttle angle and consequently the engine speed. Preferably, this arrangement would result in the ISC valve being maintained in an open position while the throttle angle is open. This arrangement ensures that a more-than-adequate air supply is provided when the throttle angle is rapidly decreased. The ISC valve then can close with the throttle valve. It should be noted, however, that if the closing speed of the ISC valve is too rapid, the engine speed can overshoot and hunt, as illustrated in FIG. 7 with the broken lines. This problem particularly arises when the engine is not engaged with a drive member, such as the propeller (i.e., the transmission is in neutral). Similarly, if the closing speed of the ISC valve is too slow, then the speed reduction of the engine also is slow. Such an effect often arises when the engine is engaged through the transmission with a drive member, such as the propeller. Moreover, when the transmission is in the forward drive position, the advancing force of the watercraft, which drives the propeller, can further slow the engine speed decrease. As a result, the watercraft is not as responsive to changes in operator demand.

Accordingly, an arrangement is desired in which the closing of the idle speed control valve is controlled based upon the drive state of the watercraft.

SUMMARY OF THE INVENTION

Accordingly, an idle speed control system is desired in which an idle speed control valve is opened as a throttle valve is opened and in which the idle speed control valve is closed when the throttle valve is rapidly closed.

One aspect of the present invention involves an engine for a watercraft comprises a cylinder body. At least one cylinder bore is formed in the cylinder body. A piston is mounted for reciprocation within the cylinder bore. A cylinder head is disposed over a first end of the cylinder bore. A crankcase member is disposed over a second end of the cylinder bore. An output shaft is disposed at least partially within a crankcase chamber at least partially defined by the crankcase member. The output shaft powers an output device through a shiftable transmission. A transmission sensor is capable of detecting whether the output device is engaged or disengaged. A combustion chamber is defined at least partially within the cylinder bore between the cylinder head and the piston. An intake conduit communicates with the combustion chamber. A throttle valve is disposed within the intake conduit and a throttle valve sensor is capable of sensing a position of the throttle valve. A bypass passage communicates with the intake conduit at a location between the throttle valve and the combustion chamber. An idle speed control valve is disposed along the bypass passage. A controller electrically communicates with the idle speed control valve, the transmission sensor and the throttle valve sensor. The controller is adapted to close the idle speed control valve at a rate selected from a plurality of rates when the throttle valve is rapidly closed.

Another aspect of the present invention involves a method of controlling movement of an idle speed control valve. The method comprises detecting a throttle angle, sensing a position of the idle speed control valve, determining a target position of the idle speed control valve position, comparing the target position to the sensed position, sensing an operational condition of a transmission, moving the idle speed control valve at a first rate if the target position and the sensed position differ and the transmission is in a first operational condition and moving the idle speed control valve at a second rate if the target position and the sensed position differ and the transmission is in a second operational condition.

A further aspect of the present invention involves a method of controlling an idle speed control valve in an engine for a watercraft. The method comprises sensing a throttle angle, sensing an operational condition of a transmission, moving the valve at a first rate if the operational condition of the transmission is engaged and moving the valve at a second rate if the operational condition of the transmission is disengaged.

BRIEF DESCRIPTION OF THE DRAWINGS

These and other features, aspects and advantages of the present invention will now be described with reference to the drawings of several preferred embodiments, which embodiments are intended to illustrate and not to limit the invention, and in which figures.

DETAILED DESCRIPTION OF THE PREFERRED EMBODIMENTS OF THE INVENTION

Figure 1:
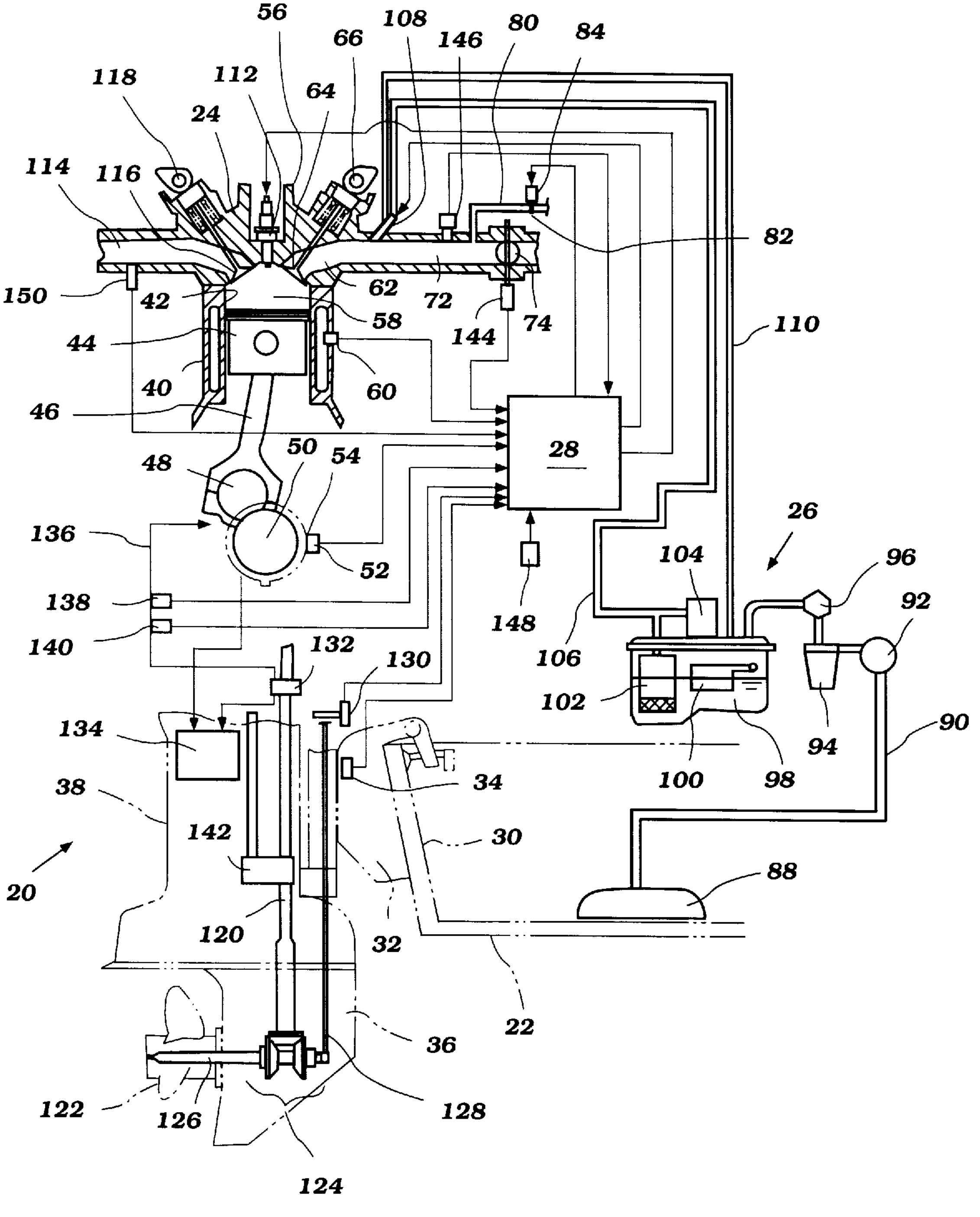
FIG. 1 is a schematic illustration of an engine and a portion of a watercraft shown in phantom having a control system arranged and configured in accordance with certain features, aspects and advantages of the present invention.

With reference now to FIG. 1, a portion of an outboard motor 20 attached to a watercraft 22 is illustrated. In addition, in FIG. 1, a portion of an engine 24 is shown in schematic cross-section. Furthermore, a portion of a fuel supply system 26, portions of the outboard motor 20, the engine 24 and the fuel system 26 are interconnected by an ECU or other suitable controller 28. While the present invention will be described in the context of an outboard motor that is attached to a watercraft, it should be apparent to those of ordinary skill in the art that the present invention can be used in other environments. For instance, the present invention may find utility in personal watercraft, small water vehicles, jet boats and the like. In particular, due to the unique operating characteristics of water vehicles, the present invention is particularly designed for use in such applications.

With continued reference to FIG. 1, the outboard motor 20 is attached to a transom 30 of the watercraft 22. In the illustrated arrangement, the outboard motor 20 is attached to the transom 30 through the use of a mounting bracket 32. Any suitable mounting bracket 32 can be used to attach the outboard motor 20 to the watercraft 22. The mounting bracket 32 preferably allows the outboard motor 20 to be tilted and trimmed about a generally horizontal axis and preferably allows the outboard motor 20 to be steered about a generally vertical axis. Such arrangements are well known to those of ordinary skill in the art.

In the illustrated arrangement, an outboard motor position sensor 34 is connected to the outboard motor 20 and to the ECU 28 to provide a signal to the ECU 28 which is indicative of a relative positioning of the outboard motor 20 and the watercraft 22. In the illustrated arrangement, the position sensor 34 is hardwired to the ECU 28. It is anticipated that any number of quick disconnect electrical couplings can be provided between the sensor 34 and the ECU 28. In addition, it is anticipated that the connection between the sensor 34 and the controller 28 can have any suitable configuration. For instance, but without limitation, the two components can be connected by a physical wire, by infrared signals, by radio waves or in any other suitable manner. Of course, other sensors will be described below and such interconnections can be used with any of the sensors and the ECU 28. Moreover, the ECU 28 preferably is designed to control various valves, injectors and ignition systems through the use of a variety of control signals. The control signals can be sent between the ECU 28 and the receptor component in any of these manners as well.

The outboard motor 20 in the illustrated outboard motor 20 generally comprises a lower unit 36 and a driveshaft housing 38. While not shown, a powerhead can be positioned above, and can be supported by, the driveshaft housing 38. The powerhead generally comprises a protective cowling which encases the engine 24 and provides a protective environment in which the engine can operate.

The engine 24 preferably is of the four-cycle, multicylinder type. In some arrangements, the engine 24 can comprise six cylinders arranged in two banks in a V-6 configuration. In other arrangements, such as that illustrated schematically in FIG. 2, the engine 24 comprises four cylinder bore arranged inline in a single bank. It should be noted that the present invention may find that some utility with engines having other operating principles. For instance, some of the features of the present invention may find applicability to two-stroke and rotary-type engines.

With continued reference to FIG. 1, the illustrated engine preferably comprises a cylinder block 40 in which one or more of the cylinder bores 42 are defined. It is anticipated that the cylinder block 40 can be replaced by individual cylinder bodies that define the cylinder bores 42. In addition, the cylinder bores 42 may receive a sleeve or other suitable treatment to reduce friction between the cylinder block 40 and a piston 44, which is arranged for reciprocation within the cylinder bore 42.

The piston 44 is mounted for reciprocation within the cylinder bore 42. The piston 44 is connected by a connecting rod 46 to a throw 48 of a crankshaft 50. As the piston 44 is driven up and down within the cylinder bore 42, a crankshaft 50 is driven for rotation about a rotational axis. A suitable speed sensor 52 preferably is provided to sense the engine speed, as indicated by the rotational speed of the crankshaft 50. In the illustrated arrangement, a pulsar coil 54 is connected to the crankshaft 50 and the speed sensor 52 operates to detect the rotational speed of the pulsar coil. The signals generated by the speed sensor 52 are then transmitted to the ECU 28 for use in manners which will be described.

A cylinder head assembly 56 preferably is positioned atop of the cylinder block 40. The cylinder head 56, in combination with the piston 44 and the cylinder bore 42, defines a combustion chamber 58. It should be noted that the cylinder block 40 in the illustrated arrangement contains a sensor 60 which outputs a signal indicative of a temperature of coolant flowing through a cooling jacket associated with the cylinder block 40. Of course, the sensor 60 can be positioned in other positions such that it outputs a signal indicative of an operating temperature of the engine 24 to the ECU 28.

An intake passage 62 is defined through a portion of the cylinder head 24. In some arrangements, more than one intake passage 62 may be defined through the cylinder head 24 into the combustion chamber 58. An intake control valve 64 can be designed to control the flow of intake air through the passage 62 into the combustion chamber 58. Movement of the intake valve 64 is controlled, in the illustrated arrangement, with a cam shaft 66. Such arrangements are well known to those of ordinary skill in the art.

Figure 2:
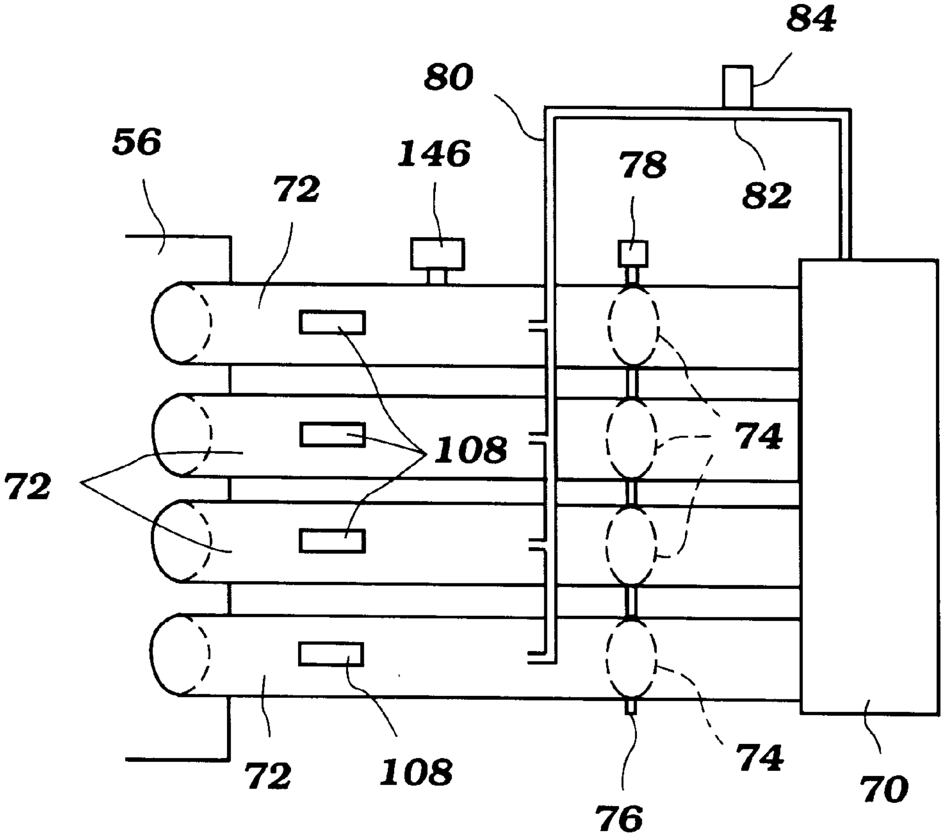
FIG. 2 is a schematic illustration of an induction system featuring a bypass passage.

With reference now to FIG. 2, air is inducted into the induction system through an air intake box 70. The air drawn into the air intake box 70 is passed to the combustion chamber 58 via a set of intake pipes 72. The intake pipes 72 extend between the air box 70 and the associated intake passages 62 for each individual combustion chamber 58. Flow through the intake pipes 72 is controlled through the use of a throttle valve 74. In the illustrated arrangement, a number of throttle valves 74 are positioned on a single rod 76 and are controlled with a single actuator 78. The actuator 78 controls the movement of the valves 74 about a rotational axis in response to changes in operator demand. The operator can change the positioning of the throttle valves 74 by operating an accelerator pedal or an accelerator lever in any manner well known to those of ordinary skill in the art. Of course, the throttle valves can be separately controlled or a single throttle valve can control the flow through the entire induction system.

In the illustrated arrangement, a bypass passage 80 is provided between or the intake box 70 and the individual runners 72 extending to the cylinder head 56. The bypass passage 80 is designed to communicate with each of the illustrated intake runners 72. The bypass passage 80 opens into the individual runners 72 downstream of the throttle control valve 74 such that when the throttle control valves 74 are closed, air may be supplied to the intake runners 72 through the bypass passage 80 under the control of an idle speed control valve 82. In some arrangements, multiple valves 82 can be provided to correspond with the multiple runners 72. The idle speed control valve 82 can be opened and closed to vary the level of flow through the associated bypass passage 80.

The idle speed control valve 82 can be moved using an actuator 84 associated with the valve 82, which will be described in more detail below. In the illustrated arrangement, the actuator 84 comprises a stepper motor. In some configurations, however, the actuator 84 may comprise a solenoid or other suitable actuator mechanism. In the illustrated arrangement, the actuator 84 is connected to the ECU 28 to receive signals from the ECU 28 that are generated in accordance with certain features, aspects and advantages of the present invention.

Air inducted through the induction system is mixed with fuel provided through the fuel supply system 26. In the illustrated arrangement, the fuel supply system 26 draws fuel from a fuel tank 88 that is positioned within the watercraft 22 in the illustrated arrangement. The fuel is drawn from the fuel tank 88 through a supply line 90 with a first low pressure fuel pump 92. In some arrangements, the low pressure fuel pump 92 may be driven by pressure variations within the crankcase. The fuel is drawn by the fuel pump 92 and supplied to a fuel filter 94 in manners well known to those of ordinary skill in the art. In addition, fuel from the fuel filter 94 is drawn by a second low pressure pump 96 for deposit into a vapor separator 98. The vapor separator 98 preferably includes a float 100 that operates to control the level of fuel within the vapor separator 98 at any given moment.

A fuel pump 102 is provided within the vapor separator 98 to provide fuel from the vapor separator 98 to the engine for combustion. In the illustrated arrangement, a pressure regulating fuel return 104 is provided. The pressure regulating fuel return 104 returns fuel when the pressure within a fuel supply line 106 exceeds a preset level.

The fuel through the fuel supply line 106 is supplied under high pressure to a fuel injector 108. The fuel injector 108 in the illustrated arrangement is designed for indirect injection. That is, the fuel injector 108 injects fuel into the induction system at a location outside of the combustion chamber 58. In some arrangements, however, the fuel injector 108 may be disposed for injection directly into the combustion chamber 58.

Fuel may be bypassed from the fuel injector 108 through a return line 110. The return line 110 maintains a flow of fuel between the vapor separator 98 and the fuel injector 108. The flow of fuel decreases the influence of combustion heat generated within the combustion chamber 58 upon the fuel and reduces vaporization of fuel. In addition, by returning the fuel to the vapor separator 98, the pressure of the fuel supplied to the fuel injector 108 can be controlled. Of course, the fuel injector 108 can be controlled using the ECU 28 in a manner known to those of ordinary skill in the art. This is represented by the control signal illustrated in FIG. 1.

The air fuel mixture drawn into the combustion chamber 58 can be ignited through the use of any suitable ignition component 112. In the illustrated arrangement, a sparkplug 112 is disposed with an electrode positioned within the combustion chamber 58. The sparkplug 112 can be fired in accordance with any suitable ignition strategy and in the illustrated arrangement, is controlled through the ECU 28.

Following combustion, the exhaust gases can be removed from the combustion chamber 58 through an exhaust passage 114 that extends from the cylinder head 56. The exhaust passage 114 includes at least one exhaust port that is disposed in the cylinder head 56 adjacent to the combustion chamber 58.

An exhaust control valve 116 controls the opening and closing of the exhaust port to allow exhaust gases to flow from the combustion chamber 58. The exhaust control valve 116 is opened and closed with an exhaust cam shaft 118 or in any other suitable manner. The exhaust gases then can be transferred from the exhaust passage 114 to the atmosphere or body of water in which the watercraft is operating in any suitable manner. For instance, in some arrangements, the exhaust gases may be routed through the driveshaft housing 38 into the lower unit 36 and out through a through-the-hub discharge.

Rotational power from the crankshaft 50 preferably is provided to a driveshaft 120. The driveshaft 120 is used to power an output device such as a propeller 122. In the illustrated arrangement, a forward-neutral-reverse bevel gear transmission 124 is interposed between the driveshaft 120 and a propeller shaft 126. The propeller shaft 126 is splined or otherwise suitably connected to the propeller 122. Movement of the propeller 122 also can be controlled by the transmission 124 in any other suitable manner.

In the illustrated arrangement, a shift rod 128 is provided to shift the transmission 124 between forward, neutral and reverse. A position sensor 130 is provided that emits a signal to the ECU 28. The signal indicates a relative position of the transmission 124. For instance, the signal may indicate that the transmission is in a forward position, a reverse position or a neutral position. In some configurations, the signal may indicate that the transmission is either engaged or disengaged. In other words, the signal may indicate that the transmission is in a forward or reverse state or, alternatively, that the transmission is disengaged and in a neutral state.

Several other components also can be driven by the driveshaft 120. In the illustrated arrangement, a lubricant pump 132 is provided. The lubricant pump 132 draws lubricant from a lubricant reservoir 134. The lubricant from the reservoir 134 is provided to the engine 24 for lubrication through a supply line 136. Preferably, a variety of sensors are provided in a lubrication system to indicate an operational state of the lubrication system. For instance, in the illustrated arrangement, a pressure sensor 138 as well as a temperature sensor 140 are provided. These sensors 138, 140 provide signals to the ECU 28.

In addition, the driveshaft 120 powers a water pump 142. The water pump 142 draws cooling water from within the body of water in which the watercraft is operating and provides it to the engine and various other components. In the illustrated arrangement, the coolant provided by the cooling pump 142 can be provided to a variety of cooling jackets. In this manner, the coolant can cool the engine as well as various operating components related to the engine and the watercraft and can be returned to the body of water in which the watercraft is operating. Of course, in some arrangements, a reservoir containing coolant can be provided from which the coolant is drawn and returned.

The illustrated arrangement also features a number of other sensors that communicate with the ECU 28. For instance, a throttle valve position sensor 144 is provided that emits a signal indicative of the positioning of the throttle valves 74. The signal may indicate the percentage opening of the throttle valves. For instance, a throttle valve that is 0% open is closed. While a throttle valve that is 80% open is substantially wide open. The illustrated ECU 28 also communicates with an induction pressure sensor 146. The induction pressure sensor 146 can be arranged to detect the pressure within an induction system associated with the engine 24. In some arrangements, a sensor 146 may be provided to a single runner 72 or may be provided to each runner 72 individually. Moreover, the ECU 28 receives a signal from an atmospheric pressure sensor 148. The atmospheric pressure sensor 148 communicates with the ECU 28 and provides a signal indicative of the pressure in the environment in which the watercraft is operating. An oxygen detection sensor 150 may be provided in the exhaust system to indicate an operational status of the engine 24. The oxygen detection sensor can be used to detect how complete combustion is within the combustion chamber 58 in any manner known to those of ordinary skill in the art.

Figure 3:
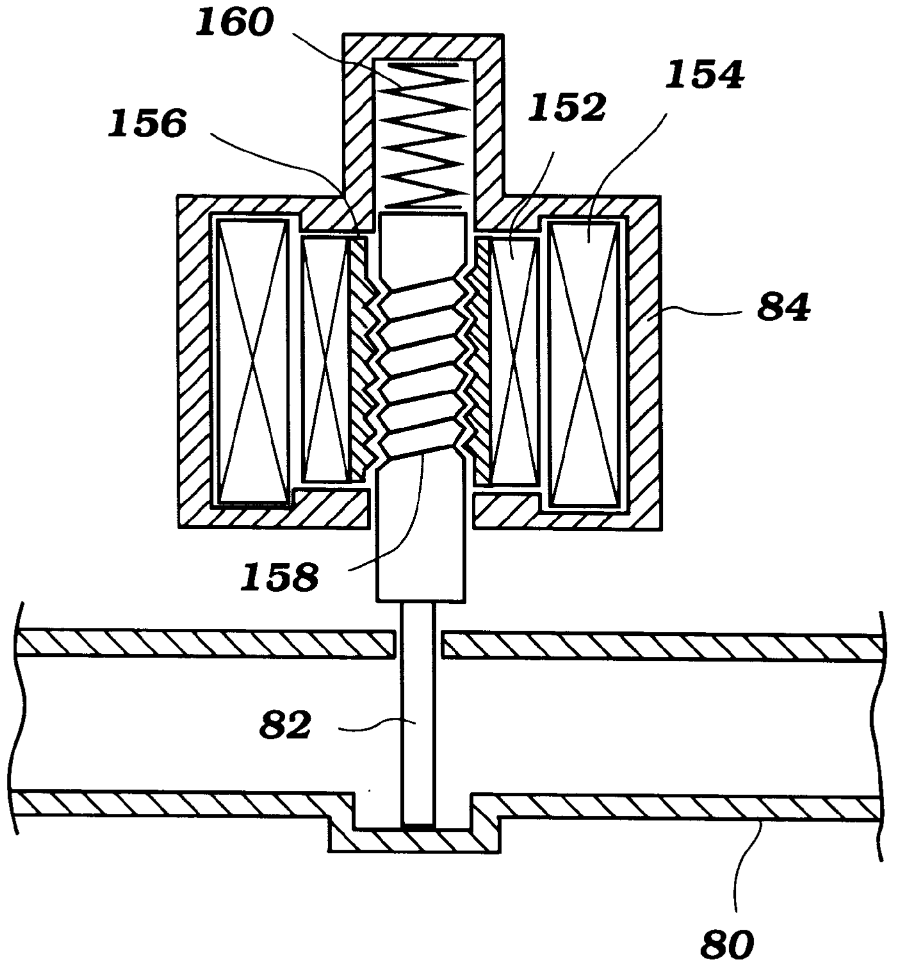
FIG. 3 is a schematic illustration of a section of an idle speed control valve arranged and configured in accordance with certain features, aspects and advantages of the present invention.

With reference now to FIG. 3, an exemplary idle speed control valve 82 is illustrated therein. In the illustrated arrangement, the actuator 84 comprises a rotor 152 and a stator 154. Preferably, the rotor and the stator are components of a stepper motor. While the present invention will be described as using a stepper motor as the actuator, solenoids and other suitable actuators also can be used.

Figure 8:
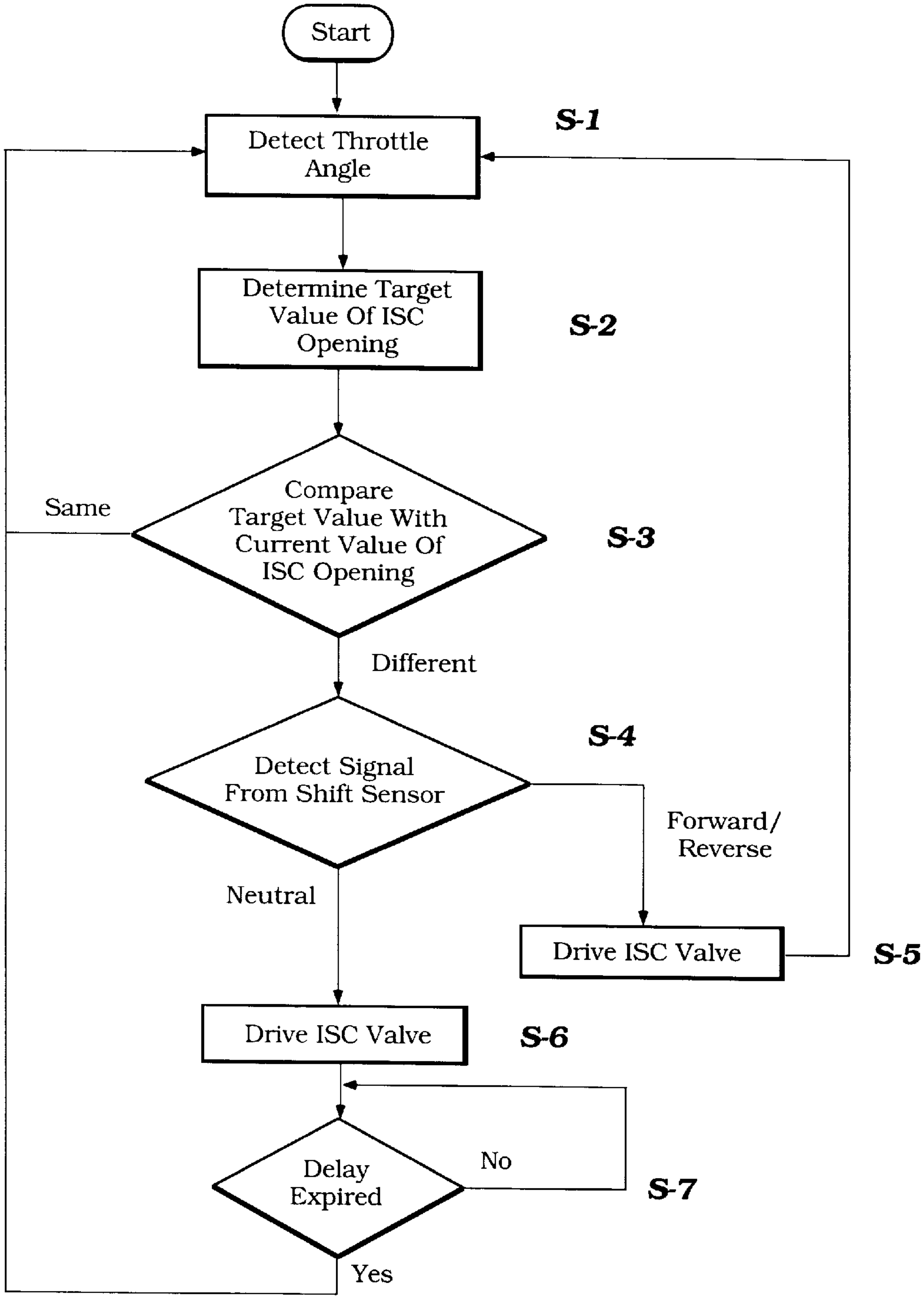
FIG. 8 is a flow diagram illustrating a control routine having certain features, aspects and advantages in accordance with the present invention.

The rotor 152 preferably comprises a threaded inner surface 156 that mates with a threaded outer surface 158 that is connected to the valve 82. In addition, a biasing member 160, or spring in the illustrated arrangement, biases against a portion of the valve 82. As the rotatable member or rotor 152 rotates relative to the stator 154, the idle speed control valve 82 is extended into and retracted out of the passage defined by the bypass passage 80. In other words, a first direction of rotation of the rotor 152 relative to the stator 154 drives the valve 82 downward while a second direction of rotation drives the valve upward, as illustrated in FIG. 8. Of course, upward and downward are relative to the figure and should not limit the present invention. The biasing member 160, which in the present arrangement happens to be a spring but need not be, urges the valve in a downward orientation to reduce the likelihood that the valve 82 is stuck in a retracted position.

Figure 4:
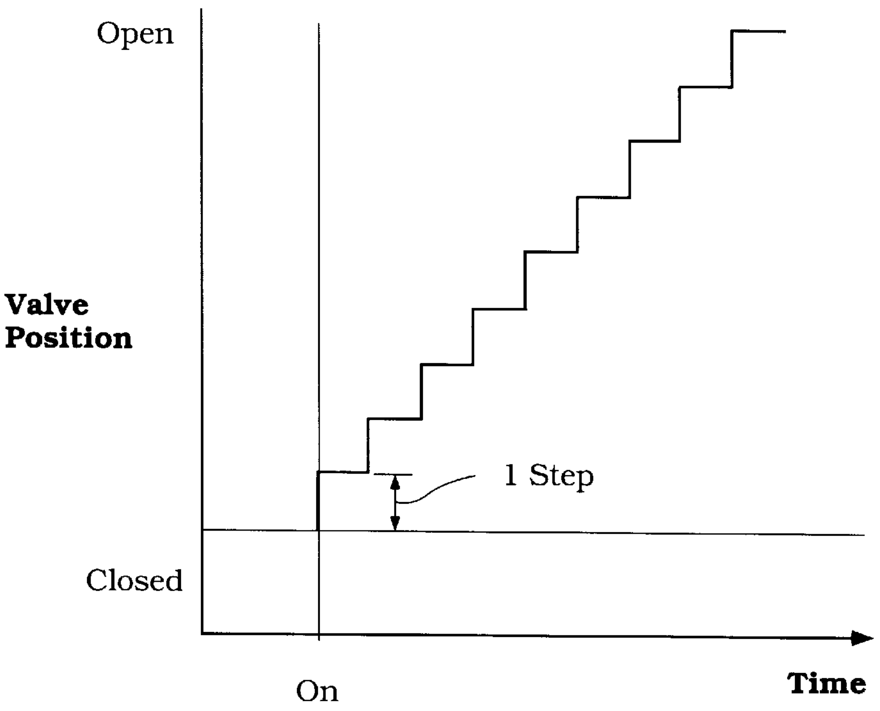
FIG. 4 is a graphical depiction of valve position over time illustrating movement of the valve through the use of a stepper motor.

With reference now to FIG. 4, a typical movement of the idle speed control valve under the influence of the actuator 84 is graphically illustrated therein. In this arrangement, the valve is moved from a closed position to an open position over time. As illustrated, a number of steps are required to move the valve between the two positions. The steps are separated by time and the movements occur quite rapidly in each step. The result is a very controlled movement of the valve between a closed and an open position and vice versa. The downside to the controlled movement, however, is that the movement tends to be relatively slow.

Figure 5:
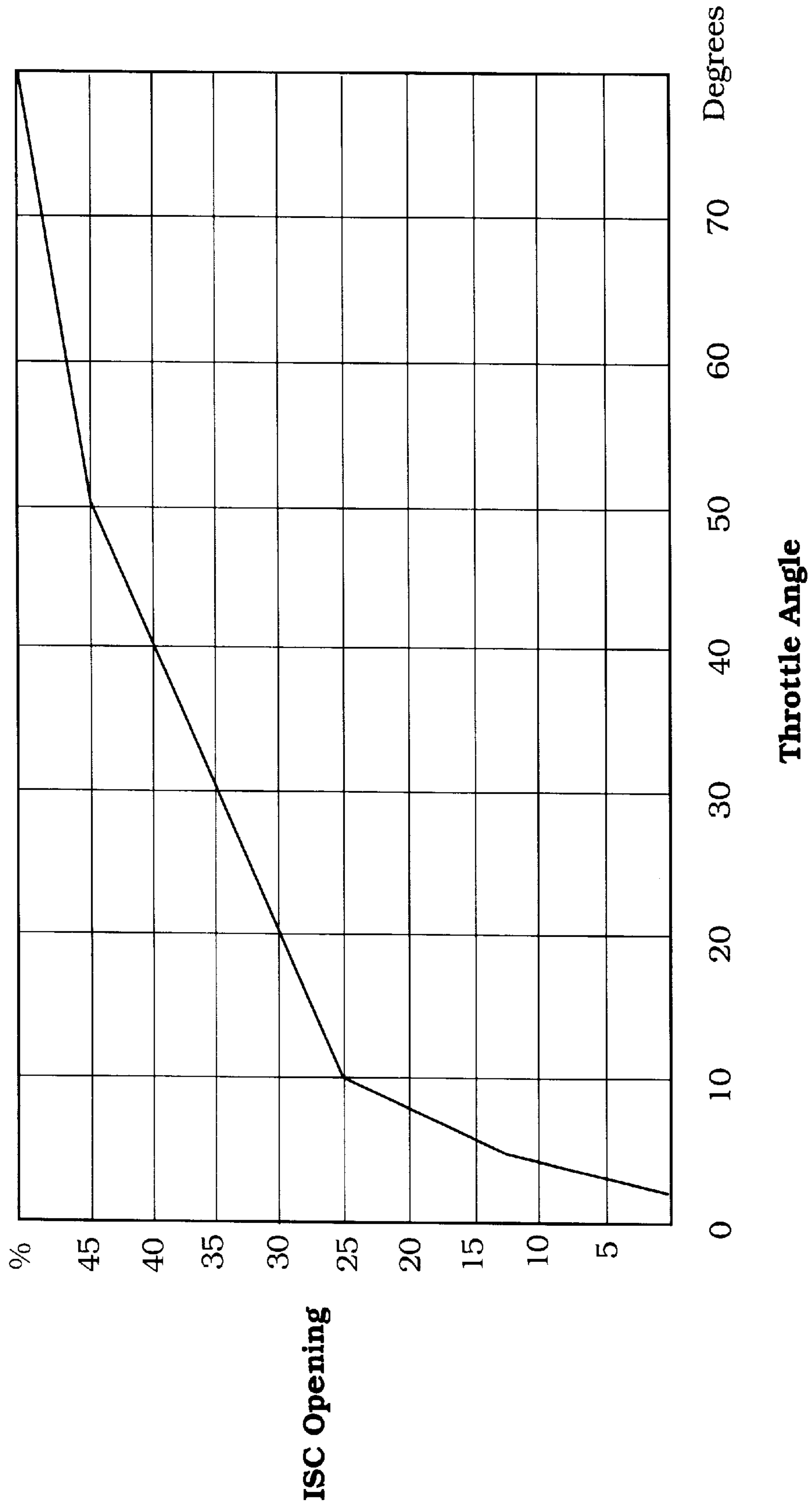
FIG. 5 is a graphical depiction of an idle speed control valve opening position relative to a throttle angle illustrating a controlled opening of the idle speed control valve in response to an opening of the throttle valve.

With reference now to FIG. 5, a graphical illustration of the idle speed control valve opening percentage relative to the throttle angle is presented. As illustrated in this exemplary embodiment, the idle speed control valve preferably is controllable opened as a throttle angle is opened. In other words, while the throttle angle is slowly opened from a closed position to a wide open position, the ISC valve is similarly opening with the largest amount of opening occurring during about the first 10° of throttle movement. Advantageously, this allows the idle speed control valve to open during just a slight advancement of the throttle angle. As can be seen from the graphical depiction of FIG. 5, the ISC valve continues to open at a slightly less rapid rate between about 10° and about 50° of throttle angle. In this configuration, the ISC valve maintains a steady opening rate while the throttle angle is opened from about 10° to about 50°. After about 50° of throttle angle, however, the opening of the ISC valve greatly decreases in the illustrated arrangement. The opening of the ISC valve advantageously is controlled based upon the positioning of the throttle valve.

Figure 6:
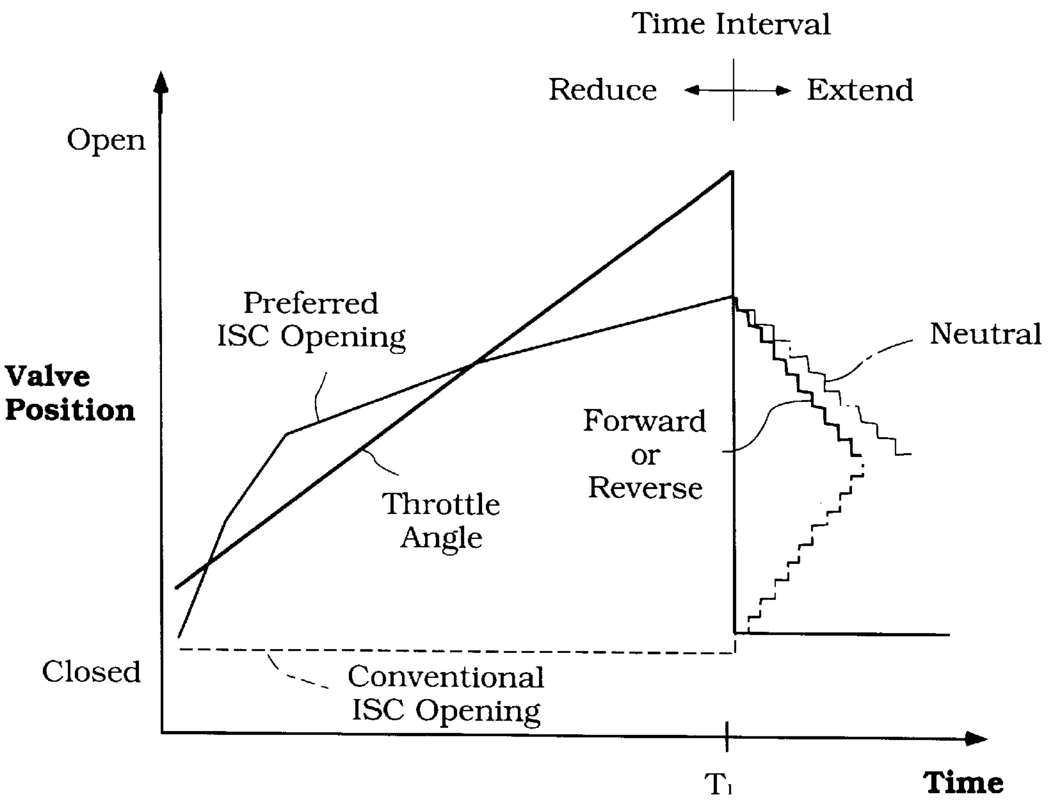
FIG. 6 is a graphical depiction of an idle speed control valve control arrangement having certain features, aspects and advantages in accordance with the present invention.

With reference now to FIG. 6, a graphical depiction of a control arrangement having certain features, aspects and advantages of the present invention is illustrated therein. In this arrangement, the ISC valve is being opened while the throttle angle is increasing. In other words, while the throttle valve is being opened, the ISC valve also is being opened. As indicated in FIG. 5, the ISC valve opens more quickly or more rapidly during the first portions of throttle valve movement. For instance, the ISC valve and the throttle valve are opened over time. At a particular moment in time, T1 in the illustrated arrangement, the throttle valve is rapidly closed. By rapidly closed, it is intended to mean that the biasing force holding open the throttle valve is removed or that the throttle valve is returned to a closed position under the control of a return spring rather than being slowly released under operator control. This is meant to differentiate between a controlled throttle angle decrease, such as when the operator slowly decreases the throttle angle, and a rapid throttle angle decrease, wherein the operator simply releases the actuator member controlling the throttle valve.

Figure 7:
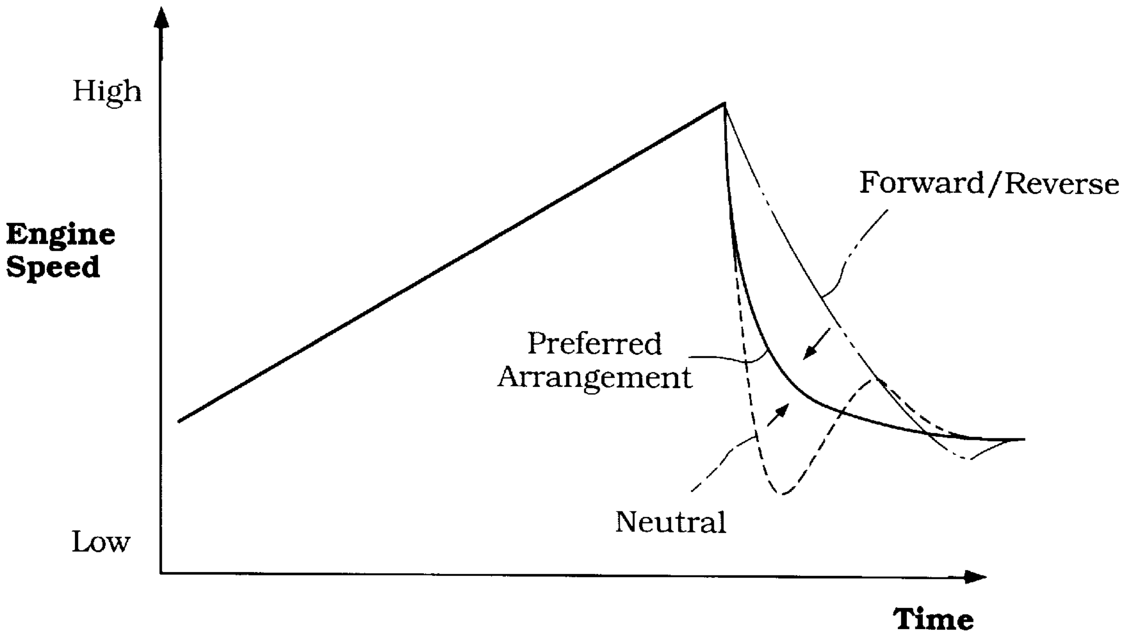
FIG. 7 is a graphical depiction of engine speed over time in which a controlled movement of an idle speed control valve arranged and configured in accordance with certain features, aspects and advantages of the present invention is contrasted with arrangements of the prior art.

In the illustrated arrangement, when the throttle valve angle rapidly decreases, the ISC valve is slowly closed under the control of the actuator 84. One aspect of the present invention is that the rate of closure of the ISC valve 82 differs depending upon whether the transmission is engaged or in a neutral position. This is illustrated in the graphical depiction of FIG. 6. The net result of varying the closure rate depending upon whether the transmission is engaged or disengaged can be viewed in the graphical depiction of FIG. 7. In this arrangement, it can be seen that engine hunting is decreased and the responsiveness of the engine speed relative to the operator demand is greatly improved.

With reference now to FIG. 8, a control routine that is capable of implementing a control strategy that achieves control similar to that described graphically in FIG. 6 is illustrated therein. With reference now to FIG. 8, the routine begins by detecting a throttle angle (see S-1). After the throttle angle has been detected, a target value of the ISC valve opening is determined. This determination is based upon the throttle angle which has been detected in S1 in the illustrated arrangement. In particular, the target value of the ISC valve opening can be chosen based upon a preprogrammed control map in which the ISC valve opening is related to the throttle angle.

After determining the target value of the ISC valve opening, the target value is compared with the currently sensed value of the ISC valve opening position (see S-3). If the target value and the current value are the same, then the routine begins again by detecting the throttle angle. However, if the target value is different from the current value, the controller senses the positioning of the transmission. In the illustrated arrangement, this is performed by detecting a signal that is being emitted from the shift sensor 130. Of course, other manners of detecting this may be used.

The determination of whether the transmission is engaged or disengaged (see S-4) is used to control the movement of the ISC valve. In the event that the transmission is engaged, then the ISC valve is moved (see S-5) and the routine begins again by detecting the throttle angle. However, if the transmission is positioned in a neutral or disengaged state, then the ISC valve is moved and the routine delays before again detecting the throttle angle (see S-6, S-7). Accordingly, due to the delay that is interposed when the transmission is in neutral, movement of the ISC valve is more rapidly performed when the engine and the transmission are engaged (in either a forward or reverse operating position) than when the engine and the transmission are disengaged (in a neutral operating condition).

Figure 9:
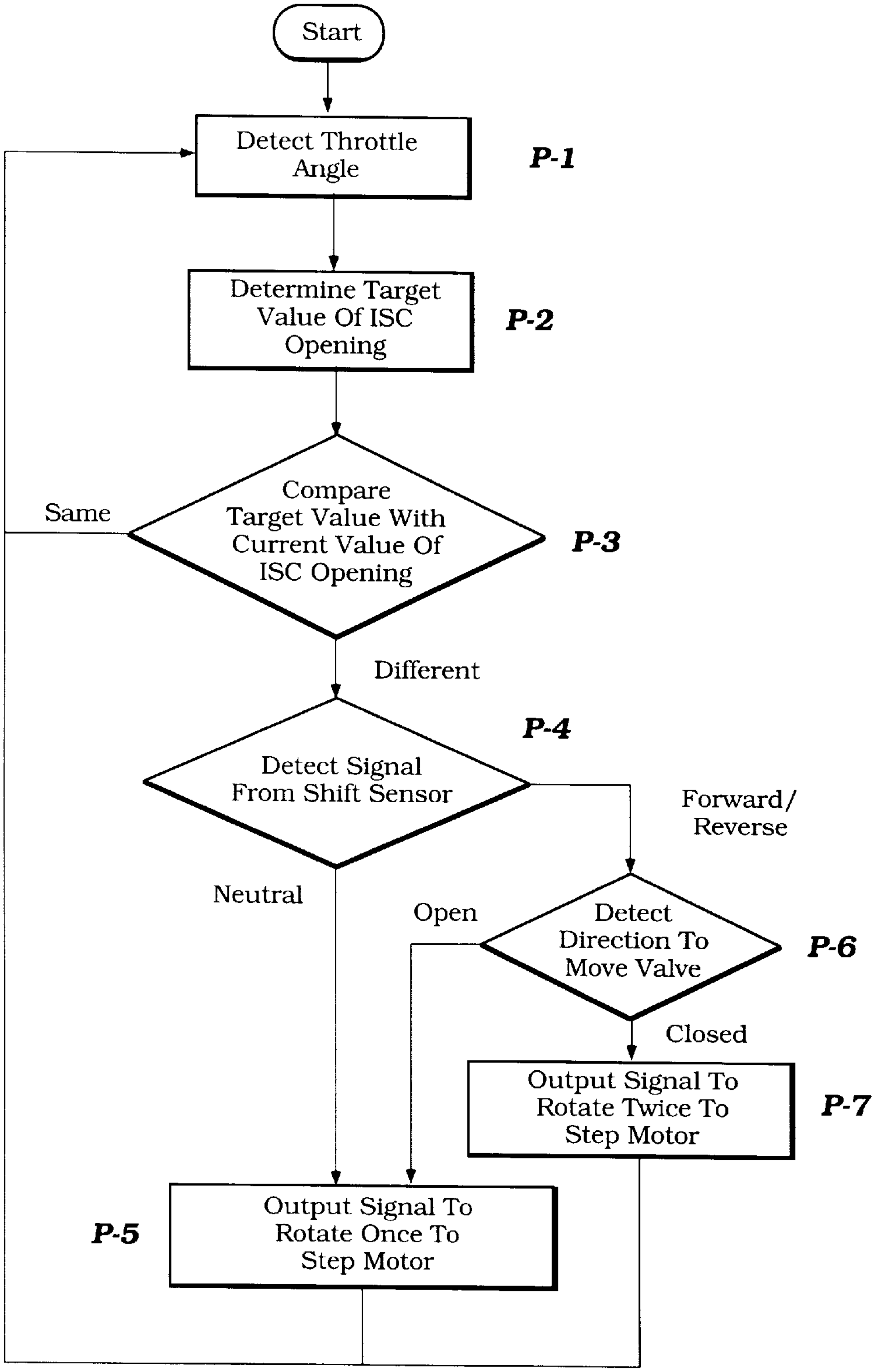
FIG. 9 is a flow diagram of another control routine also having certain features, aspects and advantages in accordance with the present invention.

With reference now to FIG. 9, another arrangement of a control system is illustrated therein. In this arrangement, the throttle angle is detected (see P-1) and the target value of the ISC valve opening is determined (see P-2). The controller compares the target value with the current value of the ISC valve opening (see P-3). If the target value and the current value are the same, then the routine begins again by detecting the throttle angle.

In the event, however, that the target value and the current value are different, then the controller senses the operating condition of the transmission (see P-4). In the event that the transmission is in a neutral state, then a single signal is transmitted to the stepper motor to open the valve one step.

However, if the transmission is detected in a forward or reverse position, then the controller determines whether the valve needs to be moved to a more-open position or a more-closed position depending on the difference between the target value and the current value (see P-6). If the ISC valve should be moved to a more-closed position, then the controller outputs two signals or a double rotation to the step motor or other actuator (see P-7). Thus, if the transmission is in a forward or reverse state and the throttle or the ISC valve should be moved to a more-closed position then the signal transmitted to the actuator indicates that a double move should be used rather than a single move. If, however, the valve should be moved towards a more-open position, then a single move, such as that output in response to a neutral transmission position, is emitted (see P-5). Accordingly, this routine opens the valves with single step movements and closes the valves with a double step movement if the transmission is engaged and with a single step movement if the transmission is in neutral position. Following each movement of the ISC valve the routine begins again.

Accordingly, the present invention provides a control routine that more rapidly closes the idle speed control valve during rapid deceleration of the engine if the transmission and engine are engaged in either a forward or reverse driving state than if the engine and transmission are in a neutral non-driven state. This accounts for the changes in loading upon the engine which can cause vast operating differences in engines used for powering watercraft, such as outboard motors, stem drives or engines used within personal watercraft. Accordingly, this arrangement accounts for the changes in load upon the engine, as well as rapid decreases in engine speed to avoid or minimize engine hunting, stalling and misfiring.

Although the present invention has been described in terms of certain preferred embodiments, other embodiments apparent to those of ordinary skill in the art also are within the scope of this invention. Thus, various changes and modifications may be made without departing from the spirit and scope of the invention. For instance, various components may be repositioned as desired and certain steps of the control routine can be combined, subdivided or interlaced with other operations. Moreover, not all of the features, aspects and advantages are necessarily required to practice the present invention. Accordingly, the scope of the present invention is intended to be defined only by the claims that follow.

What is claimed is:

1. An engine for a watercraft comprising a cylinder body, at least one cylinder bore being formed in said cylinder body, a piston being mounted for reciprocation within said cylinder bore, a cylinder head being disposed over a first end of said cylinder bore, a crankcase member being disposed over a second end of said cylinder bore, an output shaft being disposed at least partially within a crankcase chamber at least partially defined by said crankcase member, said output shaft powering an output device through a shiftable transmission, a transmission sensor being capable of detecting whether said output device is engaged or disengaged, a combustion chamber being defined at least partially within said cylinder bore between said cylinder head and said piston, an intake conduit communicating with said combustion chamber, a throttle valve being disposed within said intake conduit, a throttle valve sensor being capable of sensing a position of said throttle valve, a bypass passage communicating with said intake conduit at a location between said throttle valve and said combustion chamber, an idle speed control valve being disposed along said bypass passage, a controller electrically communicating with said idle speed control valve, said transmission sensor and said throttle valve sensor, said controller being adapted to close said idle speed control valve at a rate selected from a plurality of rates when said throttle valve is rapidly closed.

2. The engine of claim 1, wherein said plurality of rates comprises at a first rate and a second rate wherein said first rate is faster than said second rate.

3. The engine of claim 2, wherein said first rate is selected when said output device is engaged and said second rate is selected when said output device is disengaged.

4. The engine of claim 1 further comprising a stepper motor drivingly connected to said idle speed control valve, wherein said controller electrically communicates with said idle speed control valve through said stepper motor.

5. The engine of claim 4, wherein said controller is adapted to extend said duty cycle to achieve a first rate and to shorten said duty cycle to achieve a second rate.

6. The engine of claim 5, wherein said first rate is selected when said output device is engaged and said second rate is selected when said output device is disengaged.

7. The engine of claim 4, wherein said stepper motor comprises an output shaft and said output shaft is capable of rotating at a first rate and a second rate with said first rate being greater than said second rate.

8. The engine of claim 7, wherein said first rate is selected when said output device is engaged and said second rate is selected when said output device is disengaged.

9. The engine of claim 1 further comprising at least a second cylinder bore and a second combustion chamber, a second intake conduit communicating with said second combustion chamber and a second throttle valve disposed along said second intake conduit, said bypass passage communicating said second intake conduit at a location between said second throttle valve and said second combustion chamber, said bypass passage comprising a first branch that communicates with said intake conduit, a second branch that communicates with said second intake conduit and a main body that communicates with said first branch and said second branch, said idle speed control valve being positioned along said main body.

10. A method of controlling movement of an idle speed control valve, the method comprising detecting a throttle angle, sensing a position of said idle speed control valve, determining a target position of said idle speed control valve position, comparing said target position to said sensed position, sensing an operational condition of a transmission, moving said idle speed control valve at a first rate if said target position and said sensed position differ and said transmission is in a first operational condition and moving said idle speed control valve at a second rate if said target position and said sensed position differ and said transmission is in a second operational condition.

11. The method of claim 10, wherein said first operational condition comprises said transmission being engaged in a forward drive position.

12. The method of claim 11, wherein said first operational condition further comprises said transmission being engage in a reverse drive position.

13. The method of claim 10, wherein said second operational condition comprises said transmission being disengaged.

14. The method of claim 10, wherein said first operational condition comprises said transmission being engaged and said second operational condition comprises said transmission being disengaged and said first rate is greater than said second rate.

15. The method of claim 10, wherein said second rate is determined by a delay between contiguous movements of said idle speed control valve.

16. The method of claim 10 further comprising determining a direction of movement and moving said idle speed control valve at said first rate only if said idle speed control valve is to be moved in a closing direction and said transmission is in said first operational condition.

17. The method of claim 16 further comprising moving said idle speed control valve at said second rate if said idle speed control valve is to be moved in an opening direction and said transmission is in said second operational condition.

18. The method of claim 10, wherein said first rate is double said second rate.

19. A method of controlling an idle speed control valve in an engine for a watercraft, the method comprising sensing a throttle angle, sensing an operational condition of a transmission, moving said valve at a first rate if said operational condition of said transmission is engaged and moving said valve at a second rate if said operational condition of said transmission is disengaged.

20. The method of claim 19, wherein said movement of said valve is toward a closed position.

* * * * *